United States Patent
Dunk et al.

[11] Patent Number: 5,117,325
[45] Date of Patent: May 26, 1992

[54] CONTROLLABLE RECLOSER FOR POWER LINE

[75] Inventors: Michael Dunk, Racine; Clyde Gilker, S. Milwaukee, both of Wis.

[73] Assignee: Cooper Industries, Inc., Houston, Tex.

[21] Appl. No.: 468,903

[22] Filed: Jan. 23, 1990

[51] Int. Cl.$^5$ ............................................ H02H 3/06
[52] U.S. Cl. ........................................ 361/93; 361/71; 361/72; 361/73; 361/74; 361/75
[58] Field of Search ...................... 361/71-75, 361/63, 93, 111; 307/132 E; 364/483, 492

[56] References Cited

U.S. PATENT DOCUMENTS

| | | | |
|---|---|---|---|
| 3,167,686 | 1/1965 | Riebs | 361/73 |
| 4,101,816 | 7/1978 | Shepter | 318/130 |
| 4,335,437 | 6/1982 | Wilson et al. | 364/492 |
| 4,410,808 | 10/1983 | Woodhouse | 307/254 |
| 4,535,409 | 8/1985 | Jindrick | 364/481 |
| 4,594,636 | 6/1986 | Hamer et al. | 361/152 |
| 4,602,309 | 7/1986 | Gaude | 361/210 |
| 4,658,323 | 4/1987 | Dougherty | 361/93 |
| 4,670,810 | 6/1987 | Valeur | 361/5 |
| 4,734,817 | 3/1988 | Baker et al. | 361/190 |
| 4,771,358 | 9/1988 | Millner | 361/145 |
| 4,847,780 | 7/1989 | Gilker et al. | 364/492 |
| 4,849,848 | 7/1989 | Ishii | 361/93 |
| 4,912,591 | 3/1990 | LeCourt | 361/75 |
| 4,931,896 | 6/1990 | LeCourt | 361/73 |
| 4,999,730 | 3/1991 | Pickard | 361/59 |

FOREIGN PATENT DOCUMENTS 2175469  11/1986  United Kingdom ............... 361/93

Primary Examiner—Steven L. Stephan
Assistant Examiner—Thomas M. Dougherty
Attorney, Agent, or Firm—Laff, Whitesel, Conte & Saret

[57] ABSTRACT

An electronically controlled recloser for an electrical power distribution system is powered by at least one current transformer coupled to give an output in response to power line current. A voltage is stored on a large and a small capacitor in response to the line current and is compared with a reference voltage for determining the level of line current. When abnormally high levels of current appear on the line, it is opened for a short period of time. The energy stored on the capacitors is supplied to power the recloser during low line current conditions. At an end of a given time period following the opening of said line, the recloser recloses the line. If the abnormal condition persists, the recloser again opens and closes the line. When there is a surge of line current, the large capacitor is effectively removed from the circuit so that a response will not be delayed while the large capacitor charges; therefore, the charge on the small capacitor provide a quick start for immediate response. The circuit includes a novel circuit for converting a level of line current into a frequency which may be used by a microprocessor for selecting a mode of operations.

22 Claims, 4 Drawing Sheets

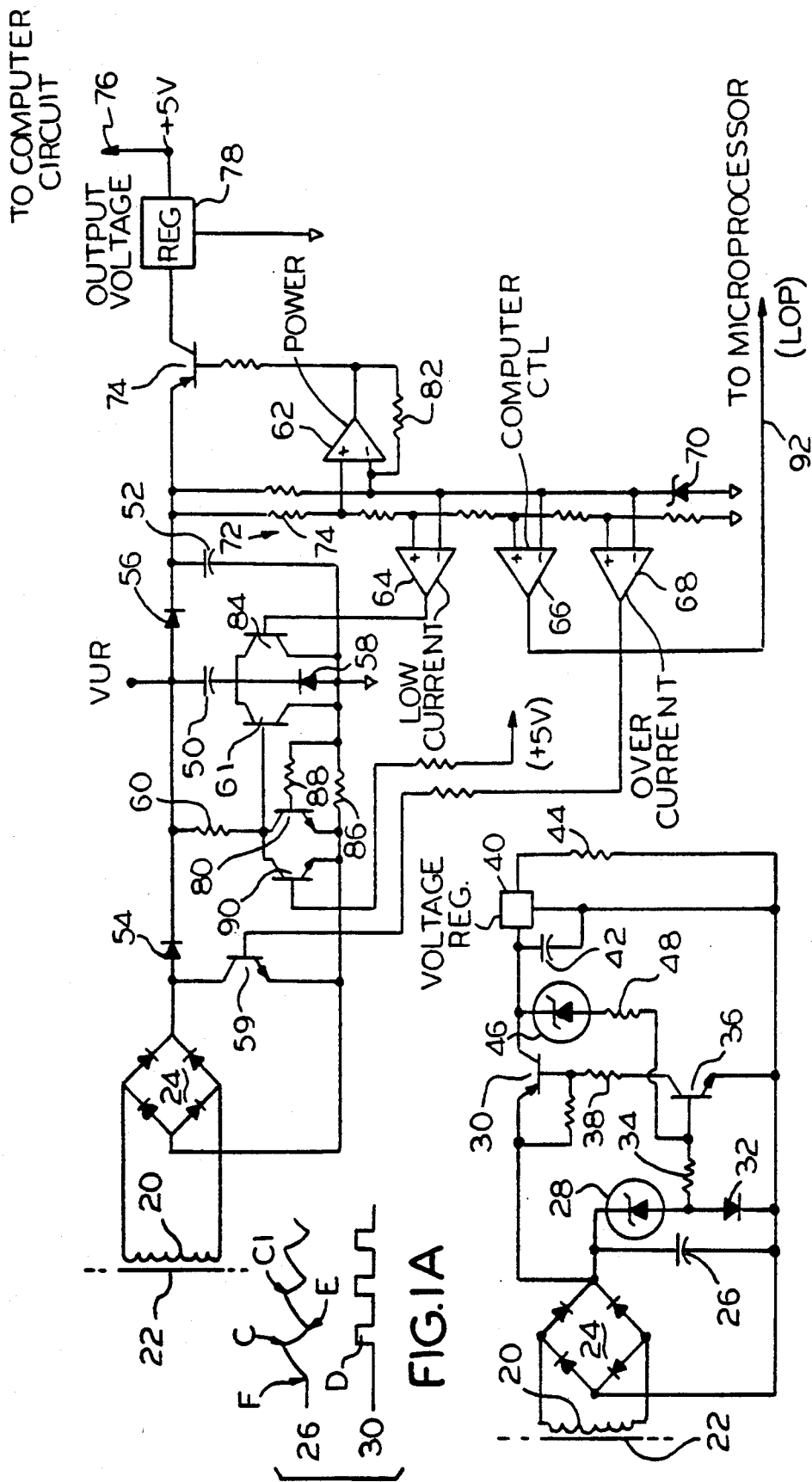

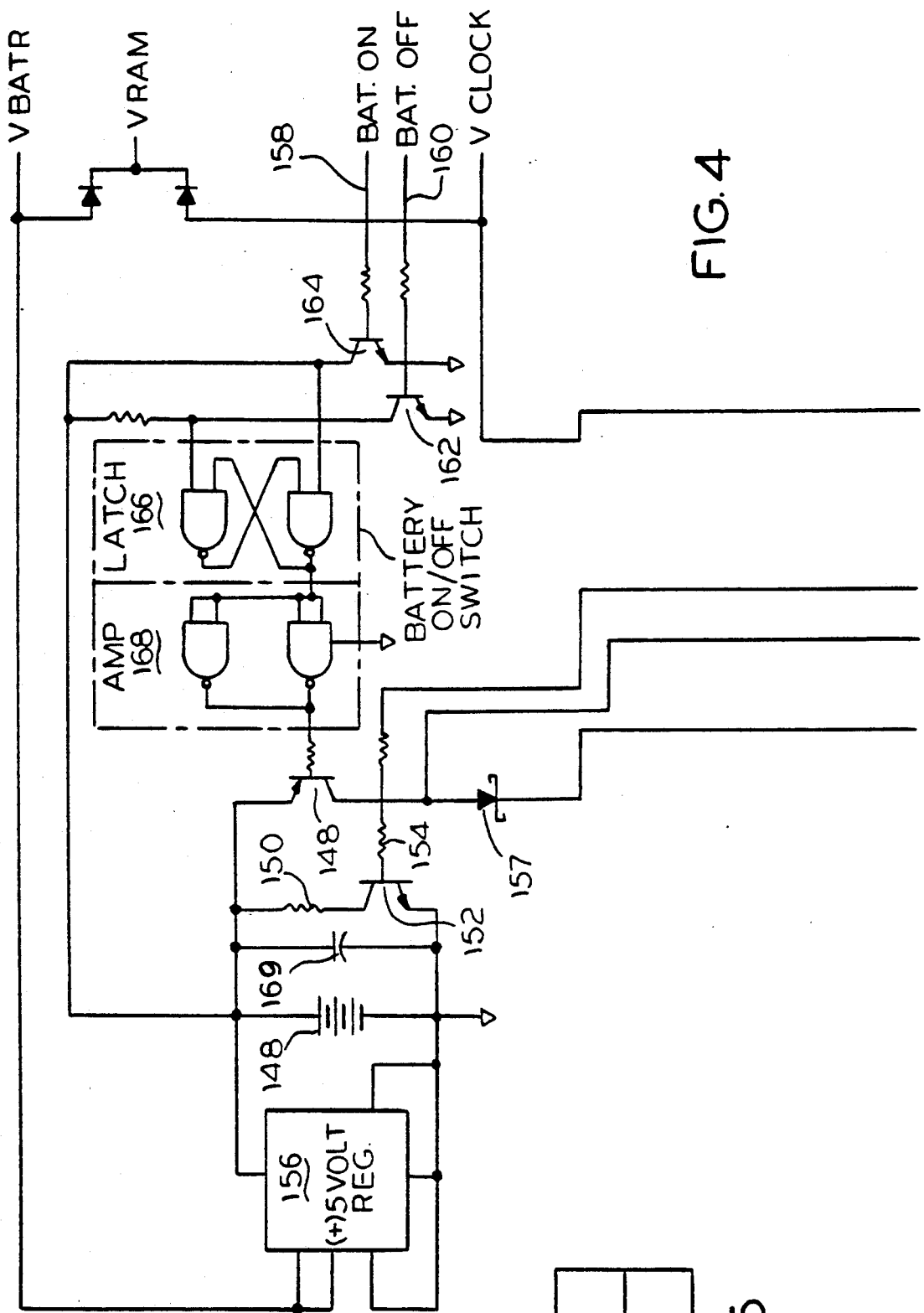

CONTROLLABLE RECLOSER FOR POWER LINE

This invention relates to reclosers and more particularly to multimodal reclosers for electrical power distribution systems.

Reference is made to U.S. Pat. No. 4,535,409 for background information on electronically controlled reclosers.

A "recloser" is a switch that opens and closes a power line, and which is operated by a recloser control device, in this invention an electronic control circuit. For convenience of expression, the switch, the controller, and the combination thereof will hereinafter simply be called a "recloser" without making a distinction therebetween unless it should be necessary to do so. It should also be understood that the term "recloser" covers various combinations of reclosers, sectionalizers, circuit breakers and the like, along with their controls, which may also be used within the scope of this invention.

A common problem in almost any electrical power distribution system is a momentary disruption of electrical service, such as might be caused by a momentary short circuit. For example, power lines strung between poles could swing under wind loading momentary touching each other or a grounded conductor. Things may fall across exposed wires, arcing could occur, or other transitory events could cause momentary power line short circuits or current surges which could burn out a fuse or trip a circuit breaker. Most of these faults are self correcting and do not require permanent fuse or circuit breaker protection because they terminate quickly. Moreover, if a fuse should burn out or a circuit breaker should trip, the power line would be open and customers would be deprived of their electrical power. Unnecessary service calls to replace fuses or reset circuit breakers would be required, thus escalating the consumer's costs.

In the past, it has been common practice to provide hydraulic reclosers which open the power line for a brief period which is sufficient for the transitory condition to subside. Then, the hydraulic control causes the recloser to reclose. That is, in the past, when there was a fault on the line, a device would rapidly open the line and cause hydraulic fluid to pass through orifices of a predetermined diameter. After a predetermined period of time enough of the hydraulic fluid would have passed through the orifice to cause the recloser to close the line in order to restore service. If the fault continued, the hydraulic recloser would reoperate and the whole process would repeat.

Recently, there has been a trend to replace all hydraulic devices used in electrical power distribution systems. Among other reasons, there is a fire danger if oil is present when an arc occurs. This is especially troublesome on the top of a pole where arcing might occur in association with a hydraulic recloser. Further, as oil filled devices become old and worn, they are likely to drip. The resulting oil soaked ground is now viewed as an environmental hazard, especially to the underground water supply.

For these and other reasons, there is presently a movement to replace all oil filled devices that are used in power distribution systems, with non-oil filled devices, as is evidenced by the teachings of U.S. Pat. No. 4,535,409. However, that replacement is not easy, especially for widely used equipment at the top of a pole where a low cost is essential and where there is no power source other than the power being carried by the line power itself.

Hydraulically controlled equipment at the top of a pole often uses high voltage, series current, coils to provide the electrical energy required to operate the hydraulic mechanism. Normally, however, the power on the line is a high voltage which cannot be used directly by an electronic control circuit. An installation of a traditional potential transformer on the top of a pole in order to power an electronic control circuit for a recloser would raise the cost of the recloser to unacceptable levels. Still, a rather substantial amount of power (about 50 mA at 5 volts) is required so that conventional small batteries would likely be too expensive or require replacement too often. Moreover, there could be occasions when there is no line current because the recloser has opened its own power source in response to a line fault.

Accordingly, an object of the invention is to provide an electronic replacement for hydraulically controlled reclosers. Here, an object is to provide new and improved reclosers which are able to operate in any of a plurality of different modes, and without expensive power supplies.

In keeping with an aspect of the invention, an electronically controlled recloser for an electrical power distribution system is powered by at least one current transformer coupled to give an output in response to line current. If there is a fault, the line is opened for a short period of time. At an end of a given time period following the opening of said line, the recloser closes the line. If the abnormal condition persists, the recloser again opens and closes the line. A comparing means selects one of a plurality of different modes of operation for the recloser. These modes are: (1) a low current on the line causes an intermittent power saving mode of operation; (2) a quick start mode brings a fast response under marginal current conditions; and (3) a high current causes an immediate shut down to prevent damage to the electronic control circuit.

An embodiment of the invention is shown in the attached drawings, wherein:

FIG. 1 is a schematic circuit diagram of a highly simplified, reduced cost recloser control circuit incorporating the invention;

FIG. 1A shows a hysteresis timing of the turn on/turn off cycle of the various circuits using the invention;

FIG. 2 is a schematic circuit diagram of a first embodiment of a multimodal power supply for use in the inventive recloser;

FIGS. 3 and 4 show a more sophisticated embodiment of a power supply circuit for a recloser;

FIG. 5 shows how FIGS. 3 and 4 should be joined to provide a complete circuit.

Figure 3:
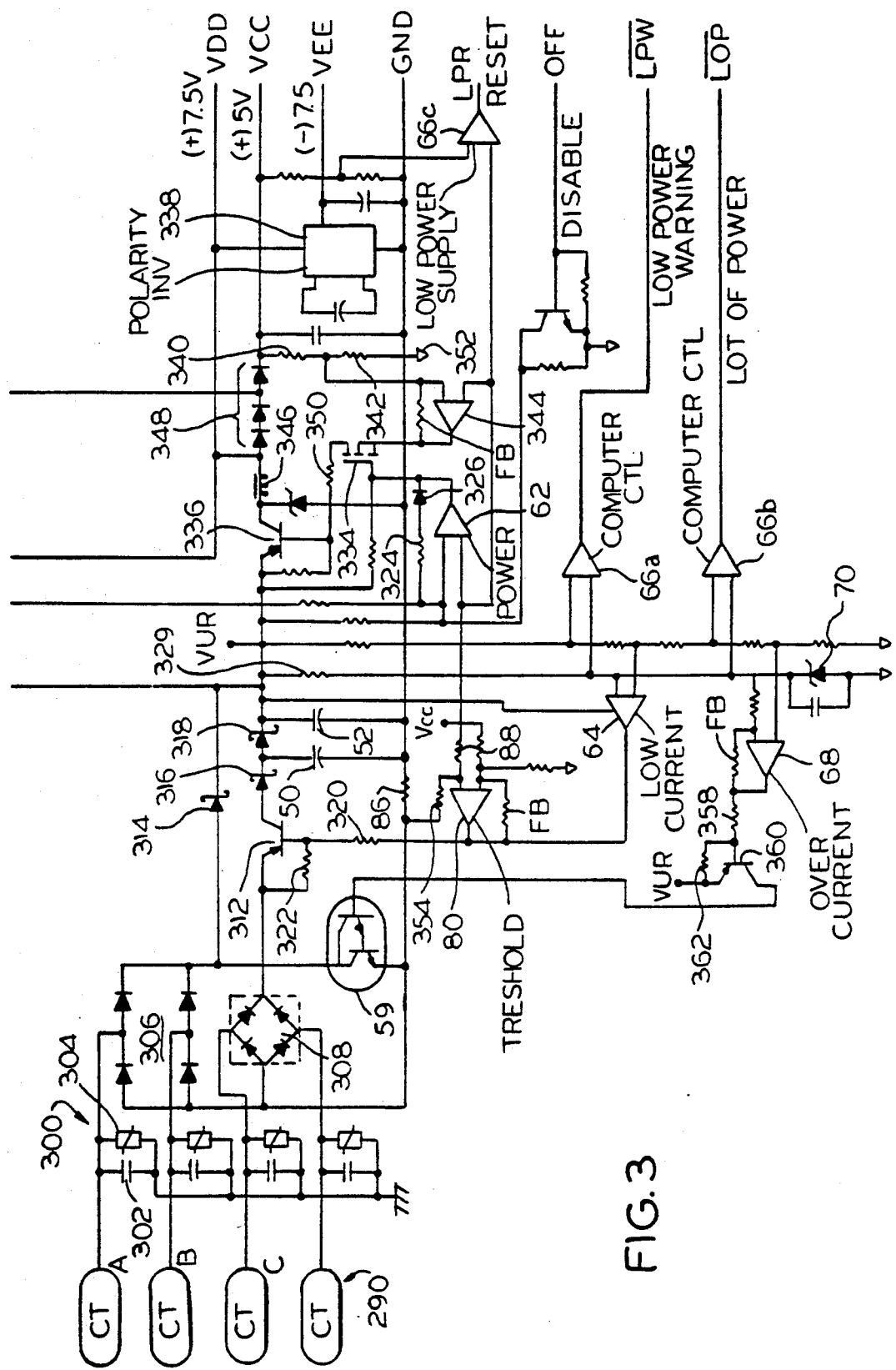

The invention uses current transformers as a power source since they are low cost, readily available devices. In its simplest form, a current transformer may simply be a winding (the secondary) on a core surrounding a line (the primary). Two forms of current transformers are commercially available. One form is a ring which through the line feeds. Therefore, the line must be opened briefly to install this form of current transformer. The other form is a split ring which simply snaps-on over the line, thus eliminating the need for opening the line. Any time that current appears on the line, the line current also induces a current to appear in the secondary winding until the core saturates. Normally, the current transformer operates in a range where the core never saturates.

A difficulty associated with the use of such a current transformer is that, if the current in the line does not at least reach a threshold level, either no or too small a current may appear in the secondary winding of the transformer. Then, there is not enough power for operating the associated recloser and its control equipment. Therefore, the invention also provides a battery which energizes the control circuit only during the periods while there is not enough line current to run the circuit and which maintains certain low current drain housekeeping functions such as clocks, memory devices, and the like. Since a lithium battery needs some constant current drain in order to remain fresh, these housekeeping functions are an advantage. It is thought that the best results are obtained when a non-chargeable lithium battery is used with an automatic 10-year, or the like, replacement cycle. However, other alternate batteries may also be used such as a trickle charged nickel-cadmium battery or a solar cell.

Another difficulty with the use of a current transformer is that little or no power is available during periods of low current or the momentary interruptions while the recloser is holding the line open. At these times, the control circuit continues to need power. Therefore, to solve the problems caused by low current or momentary interruptions of the line, without unduly increasing the battery drain, the invention charges a large capacitor which then provides the energy that drives the supply power to operate the electronic control for brief time periods until the large capacitor discharges. Depending upon the level of the low current, the large capacitor continues to cycle, charging and discharging. This way the large capacitor may act as a reservoir soaking up excess current during surge current conditions and giving out energy during low current conditions. If and when the line current is zero or too low to maintain operations, the battery takes over.

FIG. 1 shows a greatly simplified version of the inventive power supply which provides a single mode of operation. A current transformer 20 is used to take power from the line 22. That power is rectified by a full wave rectifier 24. Since this power supply of FIG. 1 has a very low cost, it is designed to work at both the lowest usable current level, and at higher current levels. Therefore, the present assumption is that the current is at such a low level that the circuit cannot continuously operate at a sustained level.

The problem is that the current transformer 20 may not supply enough available power at a useful level. Thus, a small trickle of current builds a charge upon the capacitor 26. Eventually the voltage level of the charge exceeds the break over level of the zener diode 28, which begins to conduct and limit the voltage to some level, such as 12 volts in one particular example, which is called the "turn on" voltage. The zener diode 28 conducts to supply the power that switches on and holds on the transistor 30, until the voltage drops to some threshold level (such as 7 volts, in one case). This threshold level is called the "turn off" voltage. The turn on at 12 volts and turn off at 7 volts is called a "hysteresis," which enables the power supply to function despite a widely fluctuating line current. Diode 32 is a steering and isolating diode.

Current is applied through the zener diode 28 and a resistor 34 to the base of a latch transistor 36 which switches on, substantially simultaneously with the zener diode 28 switch on. Responsive to the switching on of transistor 36, a circuit is completed from the bridge 24 and through transistor 36, and resistor 38 to the base of a switch transistor 30, which turns on. The current through zener diode 46 is a holding current for transistors 36, 30. The circuit remains in this condition until the voltage on capacitor 26 falls far enough to switch off the zener diode 46 and the transistors 36 and 30. This period is long enough for the circuit to perform all of its essential functions.

The hysteresis is shown in FIG. 1A where capacitor 26 charges to a turn on voltage C, at which the transistor 30 begins to conduct, as shown by pulse D. When transistor 30 conducts and assuming that the current on line 22 is below some level, capacitor 26 discharges to supply the energy that powers the circuit. As the discharge continues, the voltage on capacitor 26 drops to the turn off level E, transistor 30 turns off and pulse D terminates. Then, the capacitor 26 charges back to the turn on voltage Cl, where the cycle repeats. The width of pulse D is long enough for a microcomputer to turn on and check the line.

Circuit 40 is a voltage regulator. Capacitor 42 is a noise by-pass. Load 44 represents the recloser circuit which operates to open or close the line.

When the line current is high enough to equal or exceed a level required to keep the capacitor 26 fully charged, the circuit stays on continuously. If the current continues to rise, there may be a point where a further rise in voltage would damage the circuit. Before the damage level is reached, the zener diode 28 breaks down and conducts to shunt the transformer 20 via a path including zener diode 28, and diode 32. That causes the transformer 20 to cease conducting, and thereby protect against high current.

The turn on at a low current is not urgent because there is no chance for the voltage to reach a dangerous level. Thus, a long time may be tolerated for the charge on capacitor 26 to rise from zero volts at F (FIG. 1A) to the turn on voltage a[C.

On the other hand, if the line current is too high, there is an urgent need to shunt and thereby shut down the transformer 20 (FIG. 1). The capacitor 26 charges over the time between F and C (FIG. 1A) which may be long enough to burn out the circuit components at the high current. Therefore, a more sophisticated circuit (FIG. 2) provides a quick turn on when there is a high current level.

A fast acting, multimodal power supply circuit incorporating the foregoing features is shown in FIG. 2. Whenever possible, the same reference numerals identify the parts of this circuit which are the substantially same as the parts in FIG. 1.

The full wave rectifier 24 is here shown as a conventional diode bridge which is coupled to the secondary winding of the current transformer 20. However, it should be understood that other rectifiers may also be used.

The power supply control circuit comprises six transistors all of which are used as electronic switches. A large capacitor 50, and a small capacitor 52 are coupled to rectifier 24 to be charged while the line is closed and carrying at least a predetermined minimum amount of current. Capacitor 50 has in the order of 60-75 times the capacity of the small capacitor 52, i.e. about 1000μF as compared to about 15μF, in one specific case. When the line is not carrying any or enough current, these capacitors supply power to the electronic components over a period of time from C to E (FIG. 1A) which is adequate for the recloser circuit to operate (i.e. the width of hysteresis pulse D). Three steering diodes 54, 56, 58 prevent the capacitors 50, 52 from discharging through a transistor 59.

When a current appears on the line 22 and reaches or exceeds certain threshold level, a voltage is induced in winding 20 and rectified in full wave rectifier bridge 24. The rectified current is applied through a resistor 60 to the base of transistor 61, which switches on to charge large capacitor 50 over the circuit traced from the bridge 24 through transistor 61, capacitor 50, and diode 54 to the other side bridge 24.

The lower inputs of four comparators 62, 64, 66, 68 are energized at a reference level set by zener diode 70. A series of five resistors 72 form a voltage divider for supplying bias voltages to the upper inputs of the various comparators 62-68 which are thereby prepared to switch on at different levels of the voltage charge building on big capacitor 50. Comparator 62 switches on at a minimum voltage level when power may be supplied. Comparator 64 switches on at a low level of current on line 22. Comparator 66 switches on at a moderate level. Comparator 68 switches on at a high voltage level above which the voltage should not go.

As long as current transformer 20 is supplying a voltage, the small capacitor 52 is always charging without requiring any transistor to switch on, in order to provide an unregulated voltage VUR. The voltage on the capacitor 52 is applied through resistors 72 to comparators 62-68. The voltage drop across resistor 74 is the turn-on voltage for power comparator 62 which switches on when the charge reaches a given level. Responsive to the switching on of the power comparator 62, the transistor 74 turns on to apply a voltage to regulator 78 and send a start signal via wire 76 to a computer in a control circuit. Regulator 78 controls the level of the voltage applied to the computer control circuit. While any suitable power level may be used, 5 volts are used in one case.

The width (duration) of the pulse D (FIG. 1A) must be sufficient for the microcomputer to reliably perform its function, which is in the order of 100 ms, in one example. Therefore, it is a matter of mathematics to calculate the desired capacity of the large or big capacitor 50 in order to keep the system running for 100 ms. The calculated answer, in the one exemplary case, is that the capacitor 50 must be about 1000μf. With a capacitor this large, there are times when too long a period is required for the charge to build the unregulated voltage VUR to a level which switches on comparator 62.

There are two conditions to consider. One is low current and the other is a sudden surge of current. At low current (no surge), we wish to operate intermittently with hysteresis, as explained in connection with FIG. 1A. At a sudden surge, we want to have a very quick start in order to protect the circuit components from burning out. During intermittent operation, large capacitor 50 repeatedly acts as a power source to supply energy. During current surges, large capacitor 50 acts as a current sink to soak up the excess energy.

A small capacitor 52 is provided to charge quickly in order to bring the unregulated voltage VUR up to the voltage level required for turn on voltage. The difference in capacities is such that small capacitor 52 has no appreciable effect unless the large capacitor 50 is first cut out of the circuit. The charging of the large capacitor 50 is initially controlled by transistors 61, 80 which are off to prevent the large capacitor 50 from charging until after there has been a quick turn on under the control of the small capacitor 52. Thus, the system may be put into operation long before the large capacitor 50 is charged.

In greater detail, the charging of small capacitor 52 raises unregulated voltage VUR to the power turn-on level C (FIG. 1A) that switches on comparator 62. The feedback through resistor 82 holds comparator 62 in an on condition unless VUR drops below the turn off voltage E (FIG. 1A). After turn on, a bias is applied through resistor 60 to the base of transistor 61, which turns on. The switched on transistor 61 shunts diode 58 and causes the large capacitor 50 to charge. Since the present assumption is that the current is too low to cause damage, the delay while large capacitor 50 charges is irrelevant.

If the unregulated voltage VUR continues to rise and reaches a voltage of 13 volts at the upper input of comparator 64, it to turns on. The assumption here is that the line current is low and that VUR does not reach 13 volts. Therefore, comparator 64 does not turn on at this time. Accordingly, transistor 84 is off.

If there is a low current on the line, as is presently assumed, there is not enough energy from that current to run the circuit. Therefore, the large capacitor 50 begins to charge and discharge as shown in FIG. 1A. On discharge (pulse D), capacitor 50 supplies energy to regulator 78. As the discharge continues, the unregulated voltage VUR begins to fall because the line current is assumed to be too low to sustain operations. The feedback through resistor 82 drops sufficiently to turn off the comparator 62 and, therefore, the transistor 74. When this happens, the charge on large capacitor 50 again begins to rise. This leads to the cyclic operation or hysteresis explained above in connection with FIG. 1A. Again, for convenience of description, it is assumed that the turn-on voltage C is 12 volts, the turn-off voltage E is 7 volts, and the regulated voltage at the output of regulator 78 is 5 volts.

Next, assume that the current on line 22 suddenly surges and increases to a level where it exceeds the requirements necessary to keep the circuit components from being damaged. There is a quick start circuit comprising transistor 80 and resistors 86, 88. An IR drop across a small sensing resistor 86 creates a differential across the emitter and base of the transistor 80 for turning it on and for turning off transistor 61 by grounding its base. This turn on of transistor 80 indicates that a threshold has been reached in the circuit operation wherein a quick start is required. The switching on of the transistor 80 responsive to the IR drop across resistor 86 means that the large capacitor 50 is not required and is switched out of the circuit, when the transistor 61 switches off. At this time, it is assumed that line current has not raised VUR to the 13 volts required to turn on comparator 64. Therefore, the transistor 84 is off. As a result, a loop circuit is created which may be traced from bridge 24 through diodes 54, 56, small capacitor 52, and resistor 86 to the bridge 24.

Means are provided to prevent the circuit from chattering. That is, the output of voltage regulator 78 is (+)5V which is applied to the base of a transistor 90 to switch it on in parallel with transistor 80 for holding transistor 61 in an off condition. This means that the circuit does not chatter if it is operating near a threshold level. With out this transistor 90, line current could be fluctuating at a marginal level so that the IR drop across resistor 86 keeps turning the transistor 80 off and on, that would cause the line current to be alternately directed to regulator 78 and large capacitor 50. With large capacitor 50 effectively switched out of the circuit by the off condition of charging transistor 61 when transistor 90 is on, all current is directed to the regulator 78 as long as it continues to produce an output of (+) 5V. When the (+) 5V disappears, transistor 90 switches off, and the current returns to the low voltage mode.

Assume next that the line current is high enough so that a charge VUR on small capacitor 52 reaches a level (e.g. 13V) which switches on comparator 64 and in turn transistor 84. With transistor 84 on, the big capacitor 50 begins to charge and to soak up excess current.

The next event depends upon how much current is on the line 22. If the line current level is such that comparator 64 switches off, transistor 84 also switches off, and the circuit drop back to a reliance upon the control of the small capacitor 52, alone.

At normal operating conditions of the line current levels, the current transformer 20 provides enough current to reliably retain control over the control circuit. Transistor 61 switches on. Under these conditions, the voltage level at the upper input of comparator 66 switches it on to send an "LOP" (lot of power) control signal via wire 92 to a microprocessor in the control circuit. Responsive to this signal, the microprocessor continues to operate in its normal, stable mode of operation.

Next, assume that there is a very high current which may be due to a fault condition (e.g. VUR is over 15 volts), as when there is a short circuit. At this high current level the large capacitor 50 will already have been fully charged. Comparator 68 switches on to turn on transistor 59 and thus shunts the current transformer 20. When the output of transformer 20 disappears, the capacitors 50, 52 do not receive any charging current and go into the discharge mode that is used as a source of power in the low current mode of operations. When the voltage VUR drops as the capacitors discharge, all of the comparators 64, 78, 80, 84 are either off or switch off, if any of them was on. When comparator 68 switches off the transistor 59 also turns off to remove the shunt across the current transformer 20.

Once again, the current transformer provides a current for charging capacitors 50, 52, which may cause any one of the above described modes of operation, depending upon the level of the line current. If the high level of current persists, comparator 68 comes on and again switches on the transistor 59 to again shunt the transformer. The off/on switching of the transistor 59 causes it to act as a switching regulator to maintain a stable voltage.

FIGS. 3, 4 (when joined as shown in FIG. 5) shows another version of a power supply battery circuit. Non-limiting exemplary voltage are shown in FIG. 3.

The battery 148 (FIG. 4) is preferably a lithium battery, a characteristic of which is that a very small but constant drain is required to keep it fresh. This drain is supplied through a current limiting resistor 150 while transistor 152 is switched on. This transistor 152 is switched on responsive to a signal applied through a resistor 154 when the current transformers are actively supplying current. Circuit 156 regulates the lithium battery voltage to supply the circuit needs (5 volts in one case). The Schottky diode 157 prevents a back bias on transistor 148 if VUR goes over the battery voltage. Also, the Schottky diode 157 prevents the lithium battery from trying to recharge, which might cause it to fail.

The microprocessor controls the battery circuit (FIG. 4) by signals sent via wires 158 and 160 and transistors 164 and 162. The flip-flop 166 is a latch circuit which remembers the last control signal received from the microprocessor and thus holds the battery circuit either on or off. The gates 168 are inverting amplifiers for supplying adequate power to maintain the transistor 148 in an on or off condition.

Capacitor 169 is large enough to provide a high level of current for solenoid or relay operations.

Means are provided for bridging time gaps which exceed the minimum represented by the width of pulse D (FIG. 1A—100 ms, in one case). In greater detail, from the foregoing, it will be recalled that a minimum computer operating time is assured. However, the recloser is a mechanical switch that requires longer than this minimum period of time to operate. If the line is open so that no current is present, the recloser operate time is even longer. Beyond this, a power company may make administrative decision as to how long the circuit should wait before certain operations occur. For example, the company may decide how long to allow for a swaying tree limb to move away from a power line before again testing the line.

For these and other reasons, the computer is programmed to switch on the battery before the line opens on a complete shut down. This switch on is controlled by signals applied to line 158, 160.

A counter is associated with the recloser to indicate how many times it opens so that the battery may be replaced after a predetermined number of recloser operating cycles. Since a recloser seldom opens a line, the battery is seldom switched on.

In general, the circuit of FIGS. 3, 4 is about the same as the circuit of FIG. 2, except that the circuit of FIG. 2 is a simplified form while circuits 3, 4 are a commercial product, designed for practical assembly. Where possible, the same reference numerals are used to identify the same parts throughout all figures.

Each of the three phase current transformers A, B, C (FIG. 3) is approximately the same as current transformer 20. A common ground current transformer 290 is seen on the left side of FIG. 4. Each current transformer is connected to an individually associated surge suppressor 300 including a capacitor 302 and a metal oxide varistor 304. The four current transformers are coupled to two full wave rectifier bridges 306, 308.

A darlington circuit 59 provides the function of transistor 59 in FIG. 2, in that it shunts the current transformer coils during over current conditions. The darlington configuration is used since it is easier and faster to switch on and off, and since it is easier to fix an exact voltage switching point.

The first mode of FIG. 3 operation to be described is when the low line current is below a certain threshold. While the threshold may be at different levels, depending upon many things which are presently irrelevant, the threshold may be thought of as being 50 mA, which is the minimum amount of current required for normal operation, in one circuit. Hence, in this example of 50 mA, this "below threshold" mode of operation occurs where the current available from the current transformers 110 is less than 50mA.

There is not enough current to switch on the transistor 312, but there is enough current to pass through a Schottky diode 314 in order to build a charge on small capacitor 52 (this building charge is the unregulated voltage "VUR"). The Schottky diodes 316, 318 do not conduct at this time since transistor 312 is off. Therefore, the larger capacitor 50 is isolated and is not charging.

The voltage building on small capacitor 52 raises the voltage VUR and, therefore, a bias voltage acting through a voltage divider upon the comparators 62–68. The resistor 329 and zener diode 70 provide a reference level which the comparators use as a basis for judging when to switch on. This bias voltage becomes high enough to make all of these comparators quite sensitive and to prepare them so that they will be fast acting when they eventually switch on. Resistors marked FB are the normal operational, amplifier feedback resistors.

When the charge on small capacitor 52 raises voltage VUR high enough, the comparator 64 switches onto apply a potential thorough bias resistor 320 to the base of transistor 312 which switches on. Resistor 322 is also a bias resistor.

With transistor 312 on, current is applied through a Schottky diode 318 to build a charge on large capacitor 50. A second Schottky diode 318 keeps the small capacitor 52 from discharging into the large capacitor 50. When the charge on capacitors 50, exceeds that of 52, both diodes 316, 318 conduct. Therefore, there comes a time when the voltage building on large capacitor 50 assumes control. As the voltage VUR raises, the power comparator 62 turns on (at about 12 volts, in one case) to power-up the circuit. The resistor 324 and diode 326 provide a feed back bias which holds the comparator 62 on for a longer period of time, thus providing a switching hysteresis.

It should be noted at this time that a circuit which was switched off has turned itself on and powered up responsive to less than an operating threshold of current.

Continuing the power-up sequence, responsive to the output of comparator 62, a MOS-FET 334 switches on to switch on transistor 336. The voltage VCC goes to the operating voltage level (5 volts, in one case). A circuit at 338 gives an inverted polarity version VEE of the voltage VDD. Thus, if VDD is +7.5 volts, for example, the voltage VEE is −7.5 volts.

The voltage VCC is applied across a voltage divider 340, 342 to produce a voltage which switches on a comparator 344 in order to switch off MOS-FET 334. This ends a period (pulse D FIG. 1A) during which the charge upon large capacitor 50 provided enough energy for the microcomputer to perform a minimum amount of testing supervisory functions. During this period, the comparators 66a, 66b are switched on to send either a low power warning LPW, or a lot of power LOP signal (as the case may be) to the computer. When the voltage VUR falls, because the capacitors 50 and 52 discharge, the comparator 62 switches off. Then, the cycle repeats in order to provide the switching hysteresis shown in FIG. 1A, responsive to the switching hysteresis provided by resistor 324, diode 326.

A circuit is provided to form a switching regulator for holding voltage VUR in the desired range (about 7 to 12 volts, in one case). That switching regulator may be traced, as follows: transistor 336, coil 346, diodes 348, voltage divider resistors 340, 342, comparator 344, MOS-FET 334, and base bias resistor 350. The voltage regulation occurs because transistor 336 switches on at 12 volts and off at 7 volts to cause large capacitor 50 to hold a charge between these voltage levels.

Thus, at lower than an adequate voltage, the circuit sequentially turns itself off and on, sending repeated signals to the computer, which keeps it informed about the status of the line current and enables it to operate the recloser in a proper manner.

The next mode of operation to be described here is a fast turn-on circuit which brings the circuit into operation responsive to an excessively fast rising surge current. Since there is enough current, the circuit could simply turn on and immediately charge both capacitors 50, 52. However, because of its large size, capacitor 50 would require a moderately long time to charge and, therefore, would delay circuit operations.

The output of a threshold device (comparator 80, which corresponds to transistor 80 in FIG. 2) is off at the beginning of this mode of operation. The A, B, C current transformers 20 supply enough power to cause an IR voltage drop across resistor 86. As the left side of resistor 86 moves away from the ground potential applied at 352, a bias appears across resistors 86, 354 to turn on a comparator 80. However, all of this takes sometime. During that period of time, the small capacitor 52 is charging through diode 314. Since there is a relatively hiqh current on the line, small capacitor 52 charges quickly with the above described results which switch on transistor 336 to bring up the full power. Comparator 80 switches on the transistor 312 to charge large capacitor 50, in order to soak up the excessive surge current.

At this time, the comparators 64, 66a, 66b are also operated since they respond to a much lower level of line current. Therefore, the microcomputer is informed about the state of the line current via the wires LPW and LOP. The need for two comparators 66a, 66b occurs as a result of software requirements. When the signal on the LPW wire so indicates, the microcomputer knows that the voltage is about to collapse and, therefore, switches on the battery circuit.

Under normal operations, the level of the line current is high enough to keep the two capacitors 50, 52 fully charged. There is no fall off of energy level caused by a discharge thereof. Hence, the circuit does not normally turn itself off and on.

The next described mode of operations occurs when the line current exceed some high level beyond which equipment will begin to burn out. It is critical and important that the shut down occurs fast enough to protect the circuit from damage from the excessive current. At this level, the comparator 68 comes on and applies a signal through a bias resistor 358 to the base of a driver transistor 360. (All other comparators 62–68, 80 are also on; the microprocessor receives its appropriate signals over lines LPW and LOP.)

The driver 360 applies a voltage to the base of a transistor in the darlington circuit 59, which switches on to shunt the current transformer coils 20 and thereby protect the circuit from high voltage. Resistor 362 is a bias resistor.

Once the current transformers are shunted, they stop supplying current to the circuit. For a period of time, the energy provided by the charge on large capacitor 50 keeps the circuit active. As the charge drops, there comes a time when the circuit turns itself off, as explained under the low current mode of operation.

When the circuit switches itself off, the driver 360 no longer supplies the current required to keep the darlington circuit 59 in a switched on condition. As the circuit 59 switches off, current from the current transformers 20 causes the small capacitor 52 to charge once more. The circuit comes back on. If excessive current persists, the circuit again shuts itself off. This on/off operation acts as a switching voltage regulator.

Figure 6:
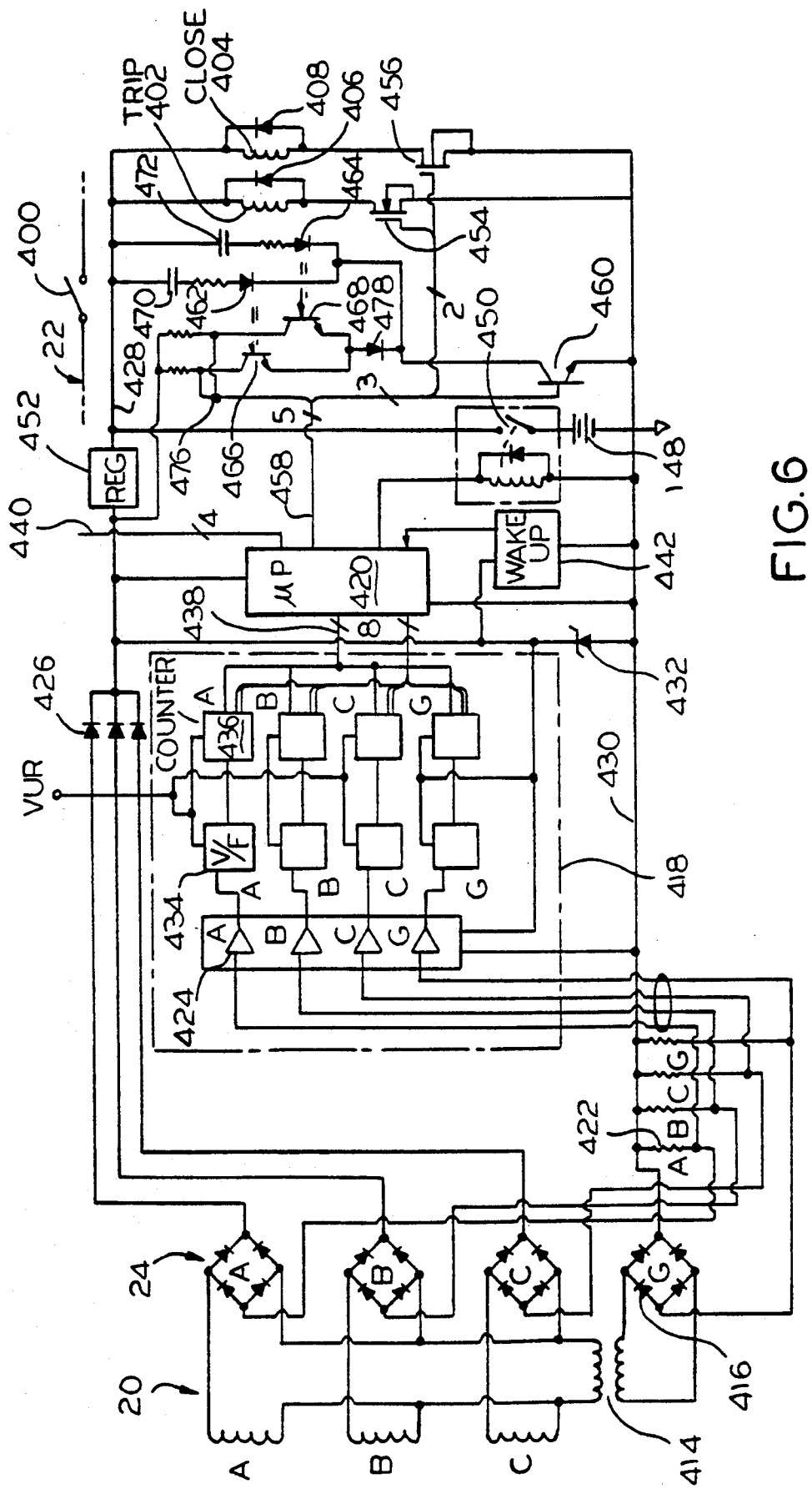
FIG. 6 is a schematic circuit diagram showing of a use of a control circuit for a recloser.

FIG. 6 illustrates a control circuit for a recloser switch coupled in line 22. More particularly, the line 22 is symbolically shown in the upper right hand corner of FIG. 6 as a single wire having a contact 400 which is normally closed, but which may open the line. Contact 400 may be part of a recloser, circuit breaker, sectionalizer, or the like. Contacts 400 open on a fault and then reclose the line 22 after a momentary fault may have subsided. Of course, the line 22 may have any suitable number of conductors. There may also be any suitable number of contacts similar to contacts 400. The opening and closing of contacts 400, and thus line 22, are under the control of "trip" and "close" windings 402, 404, respectively. Each of these windings is bypassed by a diode 406, 408 for providing spike protection.

FIG. 6 shows three current transformers 20 energized by three phases A, B, C on the power line. Each of the current transformers A-C is connected to an individually associated one of the three full wave rectifier bridges A-C. A ground transformer 414 is coupled to a full wave rectifier bridge 416. These four rectifier bridges are connected through four individually associated paths 418 to a microprocessor 420. Since all paths are the same, only one path A will be described in detail.

A rectified voltage image or sample of the phase A line voltage is applied through resistor 422 to an operational amplifier 424. A grouping diode 426 applies a rectified version of the phase A voltage to a common (or "B+") bus 428 for supplying power to the common control circuit. The ground is on bus 430. Zener diode 432 regulates the voltage level.

A voltage to frequency conversion circuit 434 converts the sampled level of the line current into a train of pulses having a frequency which is proportional to that level. Counter 436 counts the number of pulses which occur during a discrete period of time (such as 2 ms.) and sends a corresponding signal over a multi-wire cable 438 to the microprocessor 420.

The next event depends upon the information which the microprocessor 420 derives from the line current sample caused count received from counter 436. If the count is too low or is non-existing, the microprocessor 420 resets the counter to count pulses for a longer period of time. Thereafter, the microprocessor again checks the count to determine the level of the line current. Regardless of whether it does or does not require a recount, the microprocessor selects a program or mode of operations which is appropriate for the sensed level of line current.

A four wire line 440 provides an input for loading a program into the microprocessor, either during manufacture in a factory or during service in the field.

A wake-up circuit 442 is a substantial part of the circuit shown in FIGS. 2 or 3, including the comparators 64-68, the large capacitor 50, and the small capacitor 52. The wake up circuit 442 may be in any of the above described states depending upon the presence, absence, or level of line current.

Assume first that the system is off for any reasons, say the recloser has opened the line and thereby briefly lost line power, for example. Or, perhaps the line current is at a low level which is incapable of the normal and sustained circuit operation. The microprocessor 420 is off. It may be recalled that, to stay fresh a lithium battery requires a constant drain, which is used here to maintain certain house keeping functions, such as generating a continuous stream of clock pulses, for example. Therefore, if there is any line current, the voltage/frequency converter circuit 434 goes on generating cyclically recurring pulses having a frequency which represents the level of the line current. The counter 436 goes on storing the frequency count.

In this state, power eventually returns to the line at a level which causes the zener diode 432 to break over. A voltage appears in the wake up circuit 442. The various comparators of FIGS. 2 or 3 respond to send a particular signal to the microprocessor 420, instructing it as to the level of line current. The microprocessor 420 responds by selecting a mode of operation, according to the instructions programmed into it.

One mode of microprocessor operation might require power from a local source, such as the lithium battery 148. The microprocessor program 420 must be carefully written to be sure that the microprocessor switches on the battery circuit before all power is lost and does not switch off the battery at a time when it may have to switch back on before power returns. Relay contacts 450 close to connect the preferably lithium battery 148 to the battery line 428. Other suitable batteries may also be used, such as trickle charged nickel-cadmium batteries, for example.

A voltage regulator 452 converts the lithium battery potential into a voltage level which is appropriate to the microprocessor 420. For example, circuit 452 may reduce the twelve volts of battery 148 to the five volts used by one microprocessor 420.

The "trip" and "close" windings 402, 404 are controlled by two FET switches 454, 456 which are selectively turned on/off responsive to the microprocessor 420 acting over a five wire cable 458. Whenever one of the FET's is switched on, the current through it energizes the corresponding winding 402 or 404. More particularly, if FET 454 is on, trip winding 402 is energized, and line contacts 400 open. If FET 456 is on, close winding 404 is energized, and line contacts 400 are closed. The microprocessor 420 also switches on transistor 460 when either FET is energized. Transistor 460 momentarily enables LED's 462, 464 to prevent them from operating continuously and consuming too much current. These LED's are part of an opto-coupler which is completed by photocells 466, 468. An opto-coupler is a well known device which is used to provide isolation in a signal circuit which would otherwise be sensitive to t he kind of voltage spikes which occur as contacts 400 open and close.

Contacts 470 are closed when "trip" winding 402 is energized opening contacts 400, in order to energize the light emitting diode 462 which is detected by the opto-coupler photocell 466. Contacts 472 are closed when "close" winding 404 is energized closing contacts 400, in order to energize a light emitting diode 464, which is detected by the opto-coupler photocel 468. At 476, the microprocessor 420 monitors the output of the optocouplers in order to confirm that the operation of the trip or close contacts, 470, 472 and, therefore, that the commanded operation of line contacts 400 has actually taken place. Diode 478 prevents unwanted feedback.

After the line contacts 400 open or close, the microprocessor 429 switches off t he FET 454 or 456 to deenergize the appropriate winding 402 or 404. The line contact 400 remains in which ever position it was last commanded to assume.

Briefly, in review, the invention provides an intermittent mode of operations momentarily powered from a charge on a large capacitor when there is an insufficient amount of line current to sustain normal operation. Thee is a quick start mode of operation triggered by a charge on a small capacitor when there is a sudden surge of line current. Above a threshold limit of the current, and normally, the circuit operates in a continuous mode. Here the large capacitor acts as a reservoir feeding out and soaking up energy in response to a switching regulator type of operation. At still higher and dangerous levels of line current, the circuit shuts down, periodically checking the line to see if the dangerous level persists. During this periodic checking circuit acts as a switching regulator.

Those who are skilled in the art will readily perceive how to modify the invention. Therefore, the appended claims are to be construed to cover all equivalent structures which fall within the true scope and spirit of the invention.

We claim:

1. A recloser for an electrical power line comprising at least one settable switch means coupled in said line to open or close said line, said switch means remaining in the opened or closed condition in which it was last set.
   means including a microprocessor for controlling the setting of said switch means to either an opened or a closed position;
   a multimodal power source for energizing said recloser under the control of said microprocessor and for causing it to operate in different modes depending upon a level of current then appearing on said line;
   said multimodal power source comprising a large capacitor and a small capacitor, means responsive to power line current for charging said capacitors to a level which is indicative of the level of line current;
   means responsive to said line current indicating a need to open said line for coupling said capacitors to supply energy to said recloser during periods while said line is open;
   and means responsive to surge current levels on said power line for effectively removing said large capacitor from a charging circuit controlled by said charging means and for charging only said small capacitor in order to provide a quick start, said charge on said small capacitor quickly rising to a level which is sufficient for powering said recloser.

2. A recloser for an electrical power line comprising at least one settable switch means coupled in said line to open or close said line, said switch means remaining in the opened or closed condition in which it was last set;
   means including a microprocessor for controlling the setting of said switch means to either an opened or a closed position;
   a multimodal power source for energizing said recloser under the control of said microprocessor and for causing it to operate in different modes depending upon a level of current then appearing on said line;
   said multimodal power source comprising a large capacitor and a small capacitor, means responsive to power line current for charging said capacitors to a level which is indicative of the level of line current;
   means responsive to said line current indicating a need to open said line for coupling said capacitors to supply energy to said recloser during periods while said line is open;
   and means for switching said large capacitor into and out of a charging circuit to supply or soak up energy, thereby acting as a switch voltage regulator.

3. The recloser of claim 2 and means f or keeping said circuit from chattering by switching said large capacitor into and out of said circuit at marginal current levels.

4. A recloser for an electrical power line comprising at least one settable switch means coupled in said line to open or close said line, said switch means remaining in the opened or closed condition in which it was last set;
   means including a microprocessor for controlling the setting of said switch means to either an opened or a closed position;
   a multimodal power source for energizing said recloser under the control of said microprocessor and for causing it to operate in different modes depending upon a level of current then appearing on said line;
   said multimodal power source comprising a large capacitor and a small capacitor, means responsive to power line current for charging said capacitors to a level which is indicative of the level of line current;
   means responsive to said line current indicating a need to open said line for coupling said capacitors to supply energy to said recloser during periods while said line is open;
   means responsive to an excessively high level of said power line current for shutting down all power normally supplied from said power line to said recloser in order to protect said recloser, and means for periodically removing said shut down to test said line, whereby said operation of said shut down means acts as a switching voltage regulator.

5. A recloser for an electrical power line comprising at least one settable switch means coupled in said line to open or close said line, said switch means remaining in the opened or closed condition in which it was last set;
   means including a microprocessor for controlling the setting of said switch means to either an opened or a closed position;
   a multimodal power source for energizing said recloser under the control of said microprocessor and for causing it to operate in different modes depending upon a level of current then appearing on said line;
   said multimodal power source comprising a large capacitor and a small capacitor, means responsive to power line current for charging said capacitors to a level which is indicative of the level of line current;
   means responsive to said line current indicating a need to open said line for coupling said capacitors to supply energy to said recloser during periods while said line is open;
   and means responsive to an opening or closing of said line for sending a confirming signal to said microprocessor to indicate that said settable switch means has, in fact, operated as commanded to open or close said line.

6. A recloser for an electrical power line comprising at least one settable switch means coupled in said line to open or close said line, said switch means remaining in the opened or closed condition in which it was last set, means including a microprocessor for controlling the setting of said switch means to either an opened or a closed position, a multimodal power source for energizing said recloser under the control of said microprocessor and for causing it to operate in different modes depending upon a level or current then appearing on said line; a plurality of comparator means for comparing a reference voltage to a voltage level which is indicative of a level of power line current; each of said comparators selectively responding to a different level of said compared voltages, and means responsive to the selective response of aid comparator means to said level of compared voltages for selecting a particular one of said different modes of operation.

7. A recloser for an electrical power line comprising at least one settable switch means coupled in said line to open or close said line, said switch means remaining in the opened or closed condition in which it was last set, means including a microprocessor for controlling the setting of aid switch means to either an opened or a closed position, a multimodal power source for energizing said recloser under the control of said microprocessor and for causing it to operate in different modes depending upon a level of current then appearing on said line; means for converting the level of said power line current into a train or cyclically recurring pulses representing a presently existing current level, means for counting said pulses during a predetermined time period in order to store a memory of said presenting existing current level, and means including said microprocessor means responsive to said stored count for selecting one of said different mode of recloser operations.

8. A recloser for an electrical power distribution system, said recloser comprising at least one current transformer coupled to give an output in response to power line current, rectifier means coupled to said current transformer for giving a D.C. image of said power line current, means coupled to said rectifier means for storing energy in response to said power line current, said means for storing energy comprising a large storage means and a small storage means, both of said storage means storing energy during periods of normal power line current, means for eliminating the storage of energy on said large storage means during periods of surging line current in order to provide a quick action responsive to energy storage on said small storage means, means for comparing a level of said stored energy with a reference voltage for detecting abnormal line current, means for opening said power line responsive to a detection of said abnormal current when said line current is too high, means responsive to said comparing means for selecting a mode for supplying said stored energy to power said recloser during the opening of said line, and means responsive to an end of a given time period following the opening of said line for reclosing said line.

9. The recloser of claim 8 wherein said large storage means provides enough energy independent of other sources of energy to cause an operation of said recloser throughout a given time period.

10. The recloser of claim 8 and a battery, and means for switching to said battery during periods when said power line current is too low to supply enough energy to operate said recloser.

11. A recloser for an electrical power distribution system, said recloser comprising at least one current transformer coupled to give an output sample in response to power line current, means for converting the level of said sampled power line current into a train of cyclically recurring pulses representing a presently existing current level, means for counting said pulses during a predetermined time period in order to store a memory of said presently existing current, rectifier means coupled to said current transformer for giving a D.C. image of said power line current, means coupled to said rectifier means for storing energy in response to said power line current, means for comparing a level of said stored energy with a reference voltage for detecting abnormal line current, means for opening said power line responsive to a detection of said abnormal current when said line current is too high, means responsive to said comparing means for selecting a mode for supplying said stored energy to power said recloser during the opening of said operation of said shut down means acts as a switching voltage regulator; and means responsive to said stored count for selecting a mode of recloser operation.

12. The electronically controlled recloser of claim 11 and local battery means for powering said circuit means during periods while said stored energy is insufficient to power said circuit.

13. The electronically controlled recloser of claim 12 and latch means for remembering whether said battery is or is not in use while lie is opened or closed during the operation of said circuit.

14. The electronically controlled recloser of claim 11 wherein said recloser is able to operate in a plurality of modes, said recloser further comprising means for converting the level of said power line current into a train of cyclically recurring pulses representing a presently existing current level, means for counting said pulses during a predetermined period of time in order to store a memory of said presently existing current level, and means responsive to said stored count for selecting one of said modes of recloser operation.

15. An electronically controlled recloser for use on a power distribution line, current transformer means associated with said power line for locally delivering energy responsive to current on said power line, circuit means responsive to current from said transformer for operating said recloser to open said line during momentary periods of abnormally high line conditions, means for storing said energy delivered by said current transformer for powering said circuit means during at least a portion of said open line periods; and means responsive to said energy delivered by said current transformer for delivering said energy with a hysteresis so that said delivered energy stays within a predetermined high and low range.

16. The electronically controlled recloser of claim 15 and means for shunting said current transformer in response to a command signal supplied in order to power down the said circuit means during periods of excessive line current.

17. The electronically controlled recloser of claim 15 and switching circuit means responsive to said excessive level of current on said line for momentarily operating said switching circuit means in order to shunt said current transformer, and means for repeating said momentary operation of said switching circuit if said excessive level of line current persists after the shunt is removed following said momentary operation of said switching circuit.

18. An electronically controlled recloser for use on a power distribution line, current transformer means associated with said power line for locally delivering energy responsive to current on said power line, circuit means responsive to current from said transformer for operating said recloser to open said line during momentary periods of abnormally high line conditions, means for storing said energy delivered by said current transformer for powering said circuit means during at least a portion of said open line periods, wherein said circuit means may be turned off, and means responsive to an appearance of said line current for causing said turned off circuit means to wake up and turn itself on.

19. The electronically controlled recloser of claim 18 and a resistor coupled to be energized by current delivered by said current transformer responsive to said appearance of line current for producing an IR drop across said resistor, and means responsive to said IR drop for causing said circuit to wake up and to turn itself on.

20. In an electronic circuit for controlling a power line recloser for use at a remote location where power may be interrupted for a period of time which is long enough for the electronic circuit to completely shut down, said circuit comprising means including a current transformer for delivering power responsive to current on said power line, means including a resistor for producing an IR drop responsive to current from said current transformer for starting said circuit, large and small capacitors, means for charging both of said capacitors responsive to normal and higher than normal power line currents, means for charging only said small capacitor during surges of power line current, means responsive to charges stored on said capacitors for powering said electronic circuit during intervals while said line is open, means comprising at least said small capacitor for storing a charge responsive to said current from said current transformer, means for isolating said small capacitor from other circuit components which might delay its charging, switch means responsive to a threshold level of said charge stored on said small capacitor for enabling said switch means, means responsive to a higher level of said charge on said small capacitor for quickly operating said switch means, means responsive to a detection of a level of said current from said current transformer for selecting one of several modes of circuit operations, said modes of operation comprising a normal mode of operation selected responsive to normal power line current, a minimum mode of operation selected responsive to lower than normal power line current, a quick response mode of operation selected responsive to said power line current surges, and an emergency shut down mode of operation selected responsive to higher than normal power line current.

21. The recloser of claim 20 and means for keeping said circuit from chattering by switching said large capacitor into and out of said circuit at marginal current levels.

22. In an electronic circuit for controlling a power line recloser for use at a remote location where power may be interrupted for a period of time which is long enough for the electronic circuit to completely shut down, said circuit comprising means including a current transformer for delivering power responsive to current on said power line, means including a resistor for producing an IR drop responsive to current from said current transformer for starting said circuit, means comprising at least a small capacitor for storing a charge responsive to current from said current transformer, means for isolating said small capacitor from other circuit components which might delay its charging, switch means responsive to a threshold level of said charge stored on said small capacitor for enabling said switch means, means responsive to a higher level of said charge on said small capacitor for quickly operating said switch means, said recloser being able to operate in any of a plurality of different modes, means for converting a level of said power line current into a train of cyclically recurring pulses representing a presently existing current level, means for counting said pulses during a predetermined time period in order to store a memory of said presently existing current level, and means responsive to said stored count for selecting one of said m odes of recloser operation.

* * * * *